(12) United States Patent
Brezinski

(10) Patent No.: US 6,534,448 B1
(45) Date of Patent: Mar. 18, 2003

(54) COMPOSITION AND METHOD FOR ACIDIZING WELLS AND EQUIPMENT WITHOUT DAMAGING PRECIPITATION

(75) Inventor: Michael M. Brezinski, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 114 days.

(21) Appl. No.: 09/704,943

(22) Filed: Nov. 2, 2000

(51) Int. Cl.$^7$ .............................. C09K 3/00; E21B 43/22
(52) U.S. Cl. .................. 507/90; 507/933; 507/934; 507/269; 507/277; 507/274; 507/256; 507/258; 166/300; 166/307
(58) Field of Search .................. 507/90, 933, 934, 507/269, 277, 274, 256, 258; 166/300, 307

(56) References Cited

U.S. PATENT DOCUMENTS

| | | |
|---|---|---|
| 2,963,439 A | 12/1960 | Eberhard |
| 3,142,335 A | 7/1964 | Dill et al. |
| 3,669,613 A | 6/1972 | Knox et al. |
| 3,696,040 A | 10/1972 | Mayo |
| 3,773,465 A | 11/1973 | Keeney et al. |
| 4,091,073 A | 5/1978 | Winkler |
| 4,096,914 A | 6/1978 | McLaughlin et al. |
| 4,137,972 A | 2/1979 | McLaughlin et al. |
| 4,143,052 A | 3/1979 | Barrault et al. |
| 4,167,214 A | 9/1979 | Street, Jr. |
| 4,169,797 A | 10/1979 | Johnston, Jr. et al. |
| 4,317,735 A | 3/1982 | Crowe |
| 4,356,155 A | 10/1982 | Blytas et al. |
| 4,420,565 A | 12/1983 | Schmitt |
| 4,537,684 A | 8/1985 | Gallup et al. |
| 4,574,050 A | 3/1986 | Crowe et al. |
| 4,633,949 A | 1/1987 | Crowe |
| 4,646,835 A | 3/1987 | Watkins |
| 4,661,266 A | 4/1987 | Kanda et al. |
| 4,675,120 A | 6/1987 | Martucci |
| 4,676,916 A | 6/1987 | Crema |
| 4,709,767 A | 12/1987 | Alexander |
| 4,762,626 A | 8/1988 | Emmons et al. |
| 4,781,901 A | 11/1988 | Jeffrey |
| 4,784,778 A | 11/1988 | Shin |
| 4,784,779 A | 11/1988 | Dadgar |
| 4,815,537 A | 3/1989 | Jones |
| 4,830,766 A | 5/1989 | Gallup et al. |
| 4,836,286 A | 6/1989 | Edwards |
| 4,871,024 A | 10/1989 | Cizek |
| 4,888,121 A | 12/1989 | Dill et al. |
| 4,949,790 A | 8/1990 | Dill et al. |
| 5,013,483 A | 5/1991 | Frenier et al. |
| 5,017,281 A | 5/1991 | Sadeghi et al. |
| 5,058,678 A | 10/1991 | Dill et al. |
| 5,063,997 A | 11/1991 | Pachla et al. |
| 5,073,270 A | 12/1991 | Gallup et al. |
| 5,264,141 A | 11/1993 | Brezinski et al. |
| 5,441,929 A * | 8/1995 | Walker ..................... 507/269 |
| 5,445,221 A | 8/1995 | Vinson |
| 6,225,261 B1 * | 5/2001 | Brezinski ..................... 507/90 |
| 6,306,799 B1 * | 10/2001 | Feraud ..................... 507/90 |
| 6,415,865 B1 * | 7/2002 | Brezinski ..................... 507/269 |

FOREIGN PATENT DOCUMENTS

| | | |
|---|---|---|
| CA | 873792 | 6/1971 |
| CA | 1197673 | 12/1985 |
| CA | 1275794 | 11/1990 |
| CA | 1278178 | 12/1990 |
| CA | 1281178 | 3/1991 |
| JP | 8-105835 | * 4/1996 |

OTHER PUBLICATIONS

Petroleum Society of CIM, Michael S. Walker et al., "Iron Control in Sour Gas Wells Provides Sustained Production Increase," May 1989, Banff, Canada.

Society of Petroleum Engineers, M.L. Walker et al., Iron Control in West Texas Sour Gas Wells Provides Sustained Production Increase, pp. 303–308, 1990, Richardson, Texas.

* cited by examiner

Primary Examiner—Philip Tucker
(74) Attorney, Agent, or Firm—Robert A. Kent; Clifford C. Dougherty, III

(57) ABSTRACT

An acidizing composition and a method of acidizing a hydrocarbon bearing subterranean formation in the presence of ferric ions are provided. The acidizing composition includes an aqueous mineral acid solution, an electron donor agent and an electron transfer agent, the electron transfer agent being a source of molybdenum ions. When the aqueous mineral acid solution includes hydrochloric acid in an amount greater than approximately 17% by weight, the acidizing composition further includes a supplemental electron transfer agent, the supplemental electron transfer agent being a source of iodide ion or iodine. The electron donor agent and electron transfer agent function together to reduce ferric ion present in the mineral acid solution to ferrous ion which in turn prevents ferric hydroxide and/or free sulfur from precipitating out of the solution and reduces the formation of sludge in crude oil in the formation.

20 Claims, No Drawings

COMPOSITION AND METHOD FOR ACIDIZING WELLS AND EQUIPMENT WITHOUT DAMAGING PRECIPITATION

BACKGROUND OF THE INVENTION

1. Field of the Invention

In one aspect, the invention relates to the treatment of a hydrocarbon-bearing subterranean formation with an acidic composition to facilitate the recovery of hydrocarbons from the formation. In this aspect, the invention more specifically relates to the acid treatment of such a formation in the presence of ferric ions. It still further relates to the treatment of a hydrocarbon-bearing subterranean formation with a specific aqueous mineral acid composition formulated to prevent the precipitation of ferric hydroxide and/or free sulfur in the formation and to resist the formation of sludge in crude oil in the formation.

In another aspect, the invention relates to the treatment of metal surfaces (for example, the internal metal surfaces of industrial equipment) with an acid solution to remove scale and other deposits therefrom. In this aspect, the invention more specifically relates to the acid treatment of such surfaces with a mineral acid composition formulated to prevent the precipitation of ferric hydroxide and/or free sulfur during the treatment.

2. Description of the Prior Art

Formation acidizing or "acidizing" is a well-known method for increasing the flow of fluid from a subterranean formation. The formation is contacted with an acidic composition to react with and dissolve materials contained therein for the purpose of increasing the conductivity of the formation. The flow of fluid from the formation is therefore increased because of the increase in formation conductivity caused by the dissolution of the material.

A common method of acidizing a subterranean formation comprises the steps of conducting an acid composition to the formation through tubing disposed in a borehole penetrating the formation, forcing the acid composition into contact with the formation and permitting the acid to react with and dissolve certain materials contained in the formation to thereby enlarge pore spaces within the formation and thus increase the permeability of the formation. The acidizing of calcareous formations, such as limestone formations, has been successfully conducted utilizing hydrochloric acid, certain organic acids such as acetic acid, citric acid and formic acid and mixtures thereof.

The object of formation acidizing—increasing formation conductivity—can be frustrated if precipitates are produced in the acid solution. The precipitates can fill and plug pore spaces in the formation with the consequent result of failing to increase and possibly even decreasing formation conductivity. Problematic precipitates include compounds containing iron, nonferrous metals, free sulfur and metal sulfides.

It is well known that in acidizing a subterranean formation contamination of the acid solution with dissolved iron is inevitable. For example, many acid solutions (e.g., hydrochloric acid solutions) dissolve rust, mill scale and other iron-containing scale from metal conduits (such as the tubing disposed in the borehole) and equipment associated with the well, and also dissolve iron-containing minerals (such as magnetite ($Fe_3O_4$)) present in the formation. As the acid reacts and spends, the pH of the solution increases. Once the pH of the solution reaches a level of about 2.5, dissolved iron present in the solution in the ferric, Fe(III), oxidation state begins to precipitate in the form of ferric hydroxides (e.g., $Fe(OH)_3$, Fe(O)(OH), etc.). The ferric hydroxide precipitate can plug the formation and thus cause serious well damage. Ferrous hydroxide is much more soluble and typically not as much of a problem.

Wells containing quantities of sulfide and particularly hydrogen sulfide are sometimes referred to as "sour wells." In these wells, regardless of what they are called, the combination of sulfide ions and iron creates precipitation problems. Sulfide ions reduce ferric ions to ferrous ions by the following reaction:

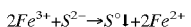

The resulting elemental or free sulfur can precipitate, plug the formation and thus cause serious well damage.

Unfortunately, attempts to control precipitation problems by maintaining the pH of the acid solution below a certain level, for example below 2.5, have failed. It simply is not feasible in most acid treatment operations to prevent the pH of the acid solution from increasing to a level of 2.5 or higher at some point in the operation. For example, when an acid such as hydrochloric acid is used to acidize a calcareous (e.g., limestone) formation, the acid typically spends to an extent such that the pH of the acid solution increases to a value of 4 or higher.

Another problem is the formation of sludge in crude oil in the formation. For example, strong hydrochloric acid solutions (e.g., $\geq 15\%$ by weight) can cause the development of sludge when the acid contacts crude oil. The presence of ferric ions in the crude or acid solution makes controlling the sludge difficult or even impossible. The quality and quantity of precipitated sludge is also related to formation temperature, acid concentration, and the concentration of asphaltenes and maltenes in the crude oil.

The presence of acid soluble ferric ion in an acidizing composition can cause other problems as well. For example, the ferric ion can lead to increased corrosion, additive separation and emulsion formation.

Numerous acidizing compositions and methods for controlling precipitation and sludge during acidizing treatments have been developed heretofore. The effectiveness of such compositions and methods varies depending upon the type of acid used, formation characteristics and conditions and other factors known to those skilled in the art.

Precipitation out of the acid solution is particularly a problem when the acid solution includes one or more mineral acids. For example, organic acids alone do not dissolve a significant amount of iron scale until the associated temperature reaches around 400° F., which often does not occur. Furthermore, ferric ion is more difficult to reduce in mineral acid systems than in organic acid systems. As discussed below, in mineral acid systems, reducing agents alone typically do not sufficiently reduce ferric ion.

There is a continuing need for improved compositions and methods for controlling precipitation and sludge during acidizing operations, particularly when mineral acid systems are utilized. There is also a continuing need for improved mineral acid solutions for acidizing metal surfaces such as the internal surfaces of industrial equipment without generating damaging precipitate.

SUMMARY OF THE INVENTION

The present invention provides a mineral acid composition that is very effective for treating wells and carrying out other operations while at the same time controlling damaging precipitation problems. The invention also provides a method of treating a subterranean formation with a mineral acid solution in the presence of ferric ions. Precipitation of insoluble compounds such as ferric hydroxide and free sulfur from the acid solution and formation of sludge in association with crude oil is prevented.

In one aspect, the invention is an acidizing composition comprising an aqueous mineral acid solution, an electron donor agent and an electron transfer agent. As discussed below, each component plays a critical role in the performance of the composition.

The aqueous mineral acid solution comprises one or more mineral acids such as hydrochloric acid or a mixture of one or more mineral acids with one or more organic acids such as acetic acid.

The electron donor agent is preferably selected from the group consisting of (1) a thiol (mercaptan) compound having a carbon chain that includes an oxygen or oxygen containing functional group (e.g., HO—, RO—) (preferably in the beta position), (2) hypophosphorous acid ($H_3PO_2$), and (3) a hypophosphorous acid precursor (e.g., a salt of hypophosphorous acid).

The thiol (mercaptan) compound suitable for use as the electron donor agent is preferably selected from the group consisting of compounds of the formula $HSCH_2C(O)R_1$ and compounds of the formula $HSCH_2C(OH)R_3R_4$ wherein:

$R_1$ is either OH, OM or $R_2$;

M is a corresponding cation of the alkoxide or a carboxylate anion of the thiol;

$R_2$ is an organic radical having from 1 to 6 carbon atoms;

$R_3$ is either H or an organic radical having from 1 to 6 carbon atoms; and $R_4$ is either H or an organic radical having from 1 to 6 carbon atoms.

For example, $R_3$ can be H and $R_4$ can be $C_2H_5$; or $R_3$ can be $C_2H_5$ and $R_4$ can be H; or $R_3$ and $R_4$ can both be H; or $R_3$ and $R_4$ can both be $C_2H_5$.

The electron transfer agent is a source of molybdenum ions, a compound or complex which generates or releases molybdenum ions in the acid solution. For example, sodium molybdate and/or ammonium molybdate can be used.

In some applications, a supplemental electron transfer agent is required. Specifically, when the aqueous acid solution of the inventive acidizing composition includes greater than approximately 17% by weight hydrochloric acid, based on the total weight of the solution, a supplemental electron transfer agent is necessary.

The supplemental electron transfer agent is a source of iodide ion or iodine, i.e., a compound or complex which generates or releases iodide ion or iodine in the acid solution. For example, sodium iodide, potassium iodide and/or iodine can be used.

In another aspect, the invention provides a method of treating a subterranean formation utilizing the inventive acidizing composition.

The invention is particularly applicable for treating hydrocarbon-bearing, subterranean calcareous formations. The inventive composition dissolves portions of the formation to thereby increase the conductivity of the formation but does not produce, foster, or otherwise generate an environment conducive to the formation of insoluble precipitate or sludge. More specifically, when used to treat a formation in the presence of ferric ions, ferrous ions and/or sulfides, the inventive composition prevents or at least reduces the precipitation of ferric hydroxide and/or free sulfur. The electron donor agent, combined with the electron transfer agent (alone or in combination with the supplemental electron transfer agent depending on the strength of the acid) very rapidly reacts with and reduces ferric ions to ferrous ions in the presence of the mineral acid solution before the ferric ion can be reduced by any competing sulfide and before the ferric ion precipitates as insoluble ferric hydroxide. Due to the fact that a mineral acid system is used, the electron transfer agent is necessary for the desired reduction to occur. When the acid solution includes greater than approximately 17% by weight hydrochloric acid, based on the total weight of the acid solution, the supplemental electron transfer agent is necessary as well.

The particular electron transfer agents used in connection with the inventive acidizing composition are very advantageous for several reasons. First, the electron transfer agents effectively function with essentially all known electron donor agents including thiol compounds (mercaptans) (e.g., thioglycolic acid and thioglycolic acid derivatives), hypophosphorous acid and hypophosphorous acid precursors (e.g., hypophosphorous acid salts). Also, the electron transfer agents are much more environmentally friendly than reducing agents used heretofore. For example, unlike copper ion and other catalysts used heretofore, the electron transfer agents used in connection with the invention are generally acceptable in the North Sea from an environmental standpoint. The electron transfer agents and resulting electron transfer system are, in effect, the heart of the invention.

For example, the invention includes a method of treating a sour well in the presence of ferric ions. During the operation, the electron donor agent and associated electron transfer agent(s) reduce ferric ion to ferrous ion thereby preventing formation of elemental sulfur.

The inventive acidizing composition can be used in many additional ways as well. For example, the composition can be used as a spearhead in the leading 25 to 33 percent of the volume of acid used for stimulating and fracturing treatments. The composition can be used to clean up disposal and injection wells and flow lines that contain ferric corrosion products. It is very effective for cleaning tubing and casing in sour wells. It is also useful for acidizing sour wells with tubing obtained from sweet wells.

When the formation being treated contains a crude which exhibits ferric ion induced sludging characteristics, the inventive acidizing composition reduces or eliminates the sludge.

The inventive composition is not limited to treating wells. For example, the composition is effective for use as a cleaning solution for industrial equipment. For example, when circulated through pumps, heat exchangers and similar equipment, the inventive composition effectively removes iron and other types of scale without allowing damaging precipitation of ferric compounds to occur.

It is, therefore, a primary object of the present invention to provide an improved mineral acid acidizing composition and an improved method of treating a subterranean formation in the presence of ferric ions and/or sulfide ions. Numerous other objects, features and advantages of the invention will be apparent to those skilled in the art upon reading the following description of preferred embodiments and accompanying examples.

DESCRIPTION OF THE PREFERRED EMBODIMENTS

In accordance with the present invention, an acidizing composition and a method of treating a subterranean formation are provided.

As used herein the term "well" refers to a bore, shaft, hole or wellbore penetrating a subterranean formation and all piping and equipment associated therewith. The term "well" includes both injection and production wells. The expression "sour well" refers to an oil and gas well that contains sulfides. The term "sulfides" includes free sulfide ions, sulfides combined with hydrogen in the form of hydrogen sulfide and sulfides combined with other elements, such as metals, in the form of other compounds. Examples of metal sulfides include ferrous sulfide, zinc sulfide and lead sulfide.

For purposes of this invention, sludge is defined as a solid material formed in crude oil which may, under certain conditions, precipitate from the crude oil. Formation of sludge in crude oil while the crude oil is in the formation can make it very difficult if not impossible to recover the oil from the formation. For purposes of this invention, crude oil subject to the formation of sludge is referred to as sludging crude.

The inventive acidizing composition comprises an aqueous mineral acid solution, an electron donor agent and a primary electron transfer agent. In some applications, the inventive composition also includes a supplemental electron transfer agent.

As used herein and in the appended claims, an aqueous mineral acid solution means an aqueous acid solution that includes one or more mineral acids. The aqueous mineral acid solution can include one or more mineral acids alone or can include a mixture of one or more mineral acids together with one or more organic acids. Useful mineral acids include hydrochloric acid, hydrofluoric acid, sulfamic acid and fluoboric acid. Useful organic acids include acetic acid, propionic acid, lactic acid, glycolic acid, citric acid and formic acid. Strong mineral acids such as hydrochloric acid and hydrofluoric acid are particularly useful herein.

The particular acid or acids as well as the concentration of acid(s) employed will vary depending on the type of acid(s) involved, the particular application (including formation characteristics and conditions) and other factors known to those skilled in the art. For example, if hydrochloric acid is used, the aqueous acid solution can contain in the range of from about 5% to about 30% by weight hydrochloric acid based on the total weight of the solution (prior to admixing the other components of the inventive acidizing composition therewith). If hydrofluoric acid is admixed with the hydrochloric acid, the hydrofluoric acid can be used in an amount in the range of from about 0.01% to about 3% by weight based on the total weight of the solution. If hydrofluoric acid is used alone, the aqueous acid solution can contain in the range of from about 0.1% to about 9% by weight hydrofluoric acid based on the total weight of the solution. If one or more organic acids are used are used in connection with the mineral acid(s), the aqueous acid solution can contain in the range of from about 0.01% to about 10% by weight organic acid based on the total weight of the solution.

An advantage of the invention is that due to the particular electron transfer agent(s) utilized, essentially all known electron donor agents can be used. As used herein and in the appended claims, the term electron donor agent means a compound capable of donating one or more electrons to the electron transfer agent. The electron donor agent employed in the inventive acidizing composition is preferably soluble in the acid solution and selected from the group consisting of (1) a thiol (mercaptan) compound having a carbon chain that includes an oxygen or oxygen containing functional group (e.g., HO—, RO—) in the beta position, (2) hypophosphorous acid ($H_3PO_2$), and (3) one or more hypophosphorous acid precursors.

The thiol (mercaptan) compound useful as the electron donor agent of the inventive composition is preferable selected from the group consisting of compounds of the formula $HSCH_2C(O)R_1$ and compounds of the formula $HSCH_2C(OH)R_3R_4$ wherein:

$R_1$ is either OH, OM or $R_2$;

M is a corresponding cation of the alkoxide or carboxylate anion of the thiol;

$R_2$ is an organic radical having from 1 to 6 carbon atoms;

$R_3$ is either H or an organic radical having from 1 to 6 carbon atoms; and $R_4$ is either H or an organic radical having from 1 to 6 carbon atoms.

M is preferably selected from the group consisting of sodium, potassium and ammonium ($NH_4$).

More preferably, the thiol (mercaptan) compound useful as the electron donor agent of the inventive composition is selected from the group consisting of thioglycolic acid, thioglycolic acid precursors, β-hydroxymercaptans, thiomalic acid and thiolactic acid. Suitable compounds include but are not limited to: thioglycolic acid, α-methylthioglycolic acid, methylthioglycolate, α-phenylthioglycolic acid, methyl-α-methylthioglycolate, benzylthioglycolate, α-benzylthio-glycolic acid, ammonium thioglycolate, calcium dithioglycolate, β-thiopropionic acid, methyl-β-thiopropionate, sodium-β-thiopropionate, 3-mercapto-1,2-propanediol, thiomalic (mercapto-succinic) acid, thiolactic acid and mercaptoethanol. Thioglycolic acid is very suitable.

In another embodiment, the electron donor agent of the inventive acidizing composition is hypophosphorous acid (also called phosphinic acid) ($H_3PO_2$) and/or one or more hypophosphorous acid precursors (i.e., a compound capable of producing hypophosphorous acid in aqueous acidic media). An example of a hypophosphorous acid precursor is a hypophosphorous acid salt. Hypophosphorous acid salts ionize in the aqueous acid solution and are protonated thus forming hypophosphorous acid. Suitable hypophosphorous salts include sodium phosphinate, calcium phosphinate, ammonium phosphinate and potassium phosphinate.

Sodium phosphinate should not be used in 28% by weight hydrochloric acid due to possible precipitation of sodium chloride.

Using hypophosphorous acid and/or one or more salts thereof as the electron donor agent is advantageous in that hypophosphorous acid and its salts are not as corrosive as other reducing agents and are better suited for high temperature applications.

The electron donor agent of the inventive acidizing composition preferably operates in conjunction with the electron transfer agent(s) to result in the reduction of all of the ferric ion in the acid solution to ferrous ion. The amount of the electron donor agent required to do this is dependent upon the molecular weight of the particular electron donor agent employed. The electron production resulting from use of the electron donor agent is quantitative; all of the electron donor agent is consumed (oxidized). Thus, the reaction is stoichiometric. This means that the quantity of the electron donor agent required will be a function of its molecular weight as well as how much ferric iron (Fe(III)) needs to be reduced. One liter of fluid containing 5,000 ppm Fe(III) contains 0.089 moles Fe(III). Thus, for example:

| | |
|---|---|
| Thioglycolic acid: | 0.089 moles × 92.12 g/mole = 8.25 g/liter; |
| Ammonium thioglycolate: | 0.089 moles × 109.15 g/mole = 9.75 g/liter; |
| 1-mercaptoethanol: | 0.089 moles × 78.14 g/mole = 7.0 g/liter. |

Accordingly, there is no limit, at least from a chemical standpoint, on how much Fe(III) can be reduced in accordance with the invention (economics will dictate the limit).

From a practical standpoint, the amount of the electron donor agent used is in the range of from about 0.01% to about 10% by volume based on the volume of the aqueous acid solution. An amount in this range is adequate for most applications (0.1% of the electron donor agent for every 500 ppm of ferric ion protection required is a good rule of thumb. A more typical range for the amount of the electron donor agent employed in the inventive composition is from about 0.1% to about 6% by volume based on the volume of the aqueous acid solution.

The electron transfer agent(s) of the inventive acidizing composition allow the desired ferric ion reduction to be achieved in mineral acid solutions. The electron transfer agent(s) also allow the desired reduction to be achieved regardless of the specific electron donor agent used. For example, the primary electron transfer agent accepts one or more electrons from the electron donor agent and delivers the electron(s) to another molecule or ion (e.g., ferric ion).

The primary electron transfer agent of the inventive acidizing composition is a source of molybdenum ions, a compound or complex which generates or releases molybdenum ions in the presence of ferric ions in the acid solution. The primary electron transfer agent is preferably a compound which is soluble in the acid solution and compatible with the composition in general (e.g., it does not produce problematic precipitates with reactive species in the solution). One or more sources of molybdenum ions can be used. Preferred sources are selected from the group consisting of ammonium molybdate and sodium molybdate. Although ammonium molybdate and sodium molybdate are preferred due to their ability to be easily handled and their stability, relatively low cost and relatively low toxicity, other sources of molybdenum ion can be used. For example, although hydrogen sulfide may be generated, molybdenum tetrasulfide ($MoS_4$) will also act as an electron transfer agent in the reduction of ferric ion to ferrous ion in accordance with the invention.

It has been discovered that molybdenum ions effectively function as an electron transfer agent in accordance with the invention regardless of which electron donor agent(s) are employed. Salts containing molybdenum ion are soluble and stable in strong acid as well as water.

Another important advantage of the invention is that the molybdenum complexes or compounds useful as the primary electron transfer agent possess significantly less aquatic toxicity than the copper-based "catalysts" used in the prior art. In an independent study, a sample of sodium molybdate crystalline was assessed for potential toxicity to the marine copepod *Arcatia tonsa* in a static test over 48 hours according to the draft method ISO 14669:1999(E) and as detailed in STL Runcorn SOP III.14. Test concentrations of sodium molybdate crystalline were prepared over the range 200.0 mg $l^{-1}$ to 2000.0 mg $l^{-1}$. A number of *Arcatia tonsa* were exposed to the test concentrations in order to determine the concentration which immobilized 50% of the copepods over 48 hours ($EC_{50}$). From this study the 24 and 48 hour EC50values were determined to be >2000.0 mg/litre. These results are outstanding. The value 2000 mg/litre (2000 ppm) is equivalent to 2,000,000 micrograms per litre. By comparison, reagent grade cuprous chloride was found to be toxic in concentrations as low as 0.01 mg/litre.

The amount of the primary electron transfer agent that should be employed in the inventive acidizing composition depends on the strength of the acid used and the speed of the reduction reaction desired. The primary electron donor agent is preferably present in the composition in an amount in the range of from about 5 pounds to about 40 pounds per 1000 gallons of acid solution. A reduction of at least 2500 ppm ferric ion in less than 5 minutes is typically a satisfactory result. For example, a 15% by weight hydrochloric acid solution generally requires at leas;t 10 pounds (15 pounds is preferred) of sodium molybdate per 1000 gallons of acid solution to achieve such a rate of reduction. For example, a 28% by weight hydrochloric acid solution may require at least 20 pounds (30 pounds is preferred) of sodium molybdate per 1000 gallons of acid solution to achieve such a rate of reduction.

The primary electron transfer agent is sufficient for many applications. However, if hydrochloric acid is used to form the aqueous acid solution and the amount of hydrochloric acid exceeds approximately 17% by weight based on the total weight of the aqueous acid solution, it is necessary to employ the supplemental electron transfer agent in the inventive composition.

The supplemental electron transfer agent is source of iodide ion or iodine, a compound or complex which releases or produces iodide ion or iodine in the presence of ferric ion in the acid solution. One or more sources of iodide ion or iodine can be used. The iodide ion/iodine source is preferably a compound which is soluble in the acid solution and compatible with the composition in general (e.g., it does not produce precipitates with reactive species in solution). Preferably, the iodide ion/iodine source is selected from the group consisting of potassium iodide, sodium iodide and iodine. These compounds are readily available in the marketplace.

The amount of thee supplemental electron transfer agent that should be used depends on the strength of the acid used and the rate of reduction of ferric ion desired. In order for the inventive composition to result in the reduction of at least 2500 ppm ferric ion in less than 5 minutes, the supplemental electron transfer agent is preferably used in an amount in the range of from about 10 to about 80 pounds, more preferably from about 15 to about 30 pounds (most preferably about 20 pounds), per 1000 gallons of the aqueous acid solution.

The overall amount of the electron transfer agent used (either the primary electron transfer agent alone or the combination of the primary electron transfer agent and the supplemental electron transfer agent) is directly related to the rate of reduction of Fe(III) to Fe(II) achieved (i.e., the more electron transfer agent the faster the reduction). For example, at a concentration of 15 lbs./Mgal of $Na_2MoO_4$ in 15% HCl, the reduction of 2500 ppm Fe(III) to Fe(II) requires between 2–3 minutes. The same reduction rate in 28% HCl requires approximately 30 lbs./Mgal $Na_2MoO_4$ and 20 lbs./Mgal KI. There are no 'threshold' amounts for the electron transfer agents. For example, if one cuts the concentration by 50% much more time is needed to complete the reduction of ferric ion—the reduction process remains quantitative. It is important to bear in mind that a rough 'Kinetic Rule of Thumb' predicts that for every 10° C., increase in temperature there will be a doubling of the rate. The above concentrations were arrived at from room temperature experiments. Thus, at 250° F., a relatively low amount of electron transfer agent should be required.

As understood b:y those skilled in the art, laboratory screening procedures can be performed to determine the acid strength, amount of electron donor agent, amount of primary electron transfer agent, and amount of supplemental electron transfer agent (if any) required to achieve the desired reduction of ferric ion to ferrous ion.

It is believed that the electron transfer system of the invention works as follows:

Molybdenum Species: The molybdenum ion exists in several oxidation states, which is very important to the invention. Any oxidation state less than or equal to 5 will reduce Fe(III) to Fe(II). However, in the :systems that were studied, some highly reduced molybdenum species appeared to be extremely air sensitive, possibly even pyrophoric, and thus problematic.

In the inventive system, Mo(V) is the active reducing species. Mo(V) is acid soluble, and easily generated from Mo(VI) using one or more of the electron donor agents suitable for use in the invention. Mo(VI) (the precursor to Mo(V)) is actually an oxidizing agent so its use as a catalyst in a reduction system would not be expected. Mo(VI) is readily available, relatively non-toxic and economical in the concentrations required in connection with the invention.

In fact, any source of Mo ions that exists in an oxidation state of 5 or less will spontaneously reduce Fe(III) to Fe(II) until all its electrons have been transferred to Fe(III) ions and it achieves the 6+ oxidation state. Accordingly, if other such Mo species exist, they could be used as stoichiometric reducing agents in accordance with the invention. It has been discovered, however, that an electron donor molecule may be used to continuously regenerate the Mo(V) species from the Mo(VI) species formed during reduction of Fe(III) to Fe(II).

The reduction mechanism depends on whether hydrochloric acid is used in forming the aqueous acid solution of the inventive composition and if so, the amount of hydrochloric acid used. When the aqueous acid solution does not constitute a concentration of greater than ca. 17% by weight hydrochloric acid, based on the total weight of the acid solution, the reactions proceed as follows:

| EDA = electron donor agent | |
|---|---|
| Mo(V) + Fe(III) → Mo(VI) + Fe(II) | (1) |
| Mo(VI) + EDA$^{n+}$ → Mo(V) + EDA$^{n+1}$ | (2) |
| Fe(III) + EDA$^{n+1}$ → Fe(II) + EDA$^{n+1}$ | (3) |

Equation 3 shows the net reaction of the reduction of Fe(III) and oxidation of the electron donor agent. The molybdenum electron transfer agent cancels from the equation as must happen for true catalysts.

Schematically, the same reaction sequence using thioglycolic acid and Mo(VI) proceeds as follows:

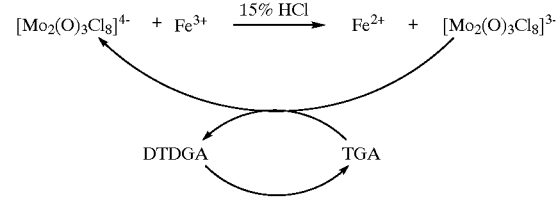

DTDGA = a dithioglycolic acid (HO$_2$CCH$_2$SSCH$_2$CO$_2$H)
TGA = thioglycolic acid The above description shows the identity of the molybdenum species present in a 15% by weight hydrochloric acid solution. This was confirmed by the following analysis: Mo(VI) species are colorless compounds irrespective of the solvent in which they are dissolved. If Mo(VI) is reduced to Mo(V) in an aqueous acid solution containing no greater than ca. 17% by weight hydrochloric acid, based on the total weight of the solution, the solution changes from colorless to red-brown. According to *Advanced Inorganic Chemistry* by Cottons and Wilkinson (5$^{th}$ ed., J. Wiley & Sons, New York 1988), the red-brown color is coming from the electronic transitions of [Mo$_2$O$_3$Cl$_8$]$^{4-}$.

Higher Strength HCl Fluids

If 20° Be hydrochloric acid is added to the above red-brown solution of Mo(V), a color change to emerald green occurs. The color change occurs when the acid strength exceeds approximately 17% by weight hydrochloric acid, based on the weight of the acid solution. According to *Advanced Inorganic Chemistry*, Cotton and Wilkinson (5$^{th}$ ed., J. Wiley & Sons, New York 1988), the species indicated by the color change is [MoOCl$_5$]$^{2-}$. This monomeric species will still reduce Fe(III) to Fe(II) in the stronger acid fluid. However, the electron donor agent will not reduce the resulting Mo(VI) back to the active electron transfer agent (Mo(V)) at an observable rate. The reasons why this is so are as follows:

The electronic donor agents of the present invention produce an electron and a proton in the reduction reaction. For example, for thioglycolic acid, the reaction proceeds as follows:

$$2HS-CH_2CO_2H \leftrightarrows HO_2CCH_2SSCH_2CO_2H + 2H^+ + 2e^- \qquad (4)$$

H$_2$PO$_3$ (hypophosphorous acid) produces two electrons and two protons.

The Nernst Equation predicts a lowered reduction potential with respect to [H$^+$] or lower reducing ability. Also, LeChatiers Principle tells us that the higher the [H$^+$] becomes, the further the equilibrium will shift to the left, favoring reactants and not products.

Another example of a reducing agent is SnCl$_2$. SnCl$_2$ is a powerful reducing agent, even in 20° Be hydrochloric acid. There is no proton production during the generation of two electrons from this molecule. Hence, there is no acid strength dependence predicted or observed.

$$Sn^{2+} \leftrightarrows Sn^{4+} + 2e^- \qquad (5)$$

The fact that the electron donor agent will no longer reduce the Mo(VI) means a catalytic system is no longer in place. In accordance with the invention, the problem is solved by the introduction of a second redox couple, the supplemental electron transfer agent. The supplemental electron transfer agent reduces Mo(VI) to Mo(V) and then is regenerated by the electron donor agent. No advantage would be gained by inclusion of the supplemental electron transfer agent in hydrochloric acid solutions containing less than or equal to approximately 17% by weight hydrochloric acid, based on the total weight of the solution.

The above was confirmed by the following experiment: Iodide ion was introduced into a colorless solution of Mo(VI) in an aqueous acid solution containing greater than approximately 17% by weight hydrochloric acid, based on the total weight of the acid solution. As the iodide ion was added, the fluid began to turn purple-brown. This color was produced at a higher rate as the acid strength was increased. The color observed in the experiment was produced by I$_2$. This was easily proved by UVVIS spectrophotometry. The green color of the reduced Mo(V) species was completely masked by the intense adsorption of I$_2$. However, no color change occurred if the experiment was carried out in an acid solution containing less than approximately 17% by weight hydrochloric acid, based on the total weight of the acid solution, showing no reduction of Mo(VI) to Mo(V) took place.

When an iodine solution was treated with an electron donor agent in an acid solution containing greater than approximately 17% by weight hydrochloric acid based on the total weight of the acid solution, the solution immediately decolorized indicating reduction of $I_2$ to $I^-$. Thus, when the purple-red solution of molybdenum ion and iodide was treated with an electron donor agent, the fluid turned green. The electron donor agent reduced iodine to colorless iodide and unmasked the emerald green color of Mo(V). The Mo(V) was then able to reduce Fe(III) to Fe(II).

In accordance with the invention, when the acid solution contains greater than approximately 17% by weight hydrochloric acid, based on the total weight of the solution, the reduction of ferric ion occurs in accordance with the following reactions:

TGA = thioglycolic acid
DTDGA = a dithiodiglycolic acid ($HO_2CCH_2SSCH_2CO_2H$)

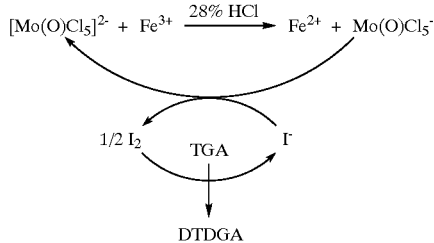

Note that both the Mo and I species cancels from the equation.

| | | | | | |
|---|---|---|---|---|---|
| Mo(V) | + | Fe(III) | → Mo(VI) | + Fe(II) | (6) |
| Mo(VI) | + | $I^-$ | → Mo(V) | + 0.5 $I_2$ | (7) |
| 0.5 $I_2$ | + | $EDA^{n+}$ | → $I^-$ | + $EDA^{n+1}$ | (8) |
| Fe(III) | + | $EDA^{n+}$ | → Fe(II) | + $EDA^{n+1}$ | (9) |

Again, the net reaction shown by equation 9 does not contain either of the electron transfer agents. The reaction shown by Equation 7 will not occur in acid strengths of approximately 17% or less by weight hydrochloric acid.

In summary, when the acid strength of the fluid becomes greater than approximately 17% by weight hydrochloric acid, based on the total weight of the acid solution, three important changes occur that cause a different mechanism to operate:

1) the reducing ability of the electron donor agent becomes less (or equivalently, the electron donor agent is more resistant to oxidation) and can no longer cause reduction of Mo(VI) to Mo(V);

2) there is a change in the electron transfer agent structure from a dimeric species to a monomeric species that apparently has a different redox potential; and 3) due to 2) above, iodide now becomes capable of reducing the monomeric molybdenum species.

The inventive acidizing composition can also include various additives. For example, one or more surface active agents can be employed to improve dispersion of the components in the acid solution. Surface active agents are particularly useful when relatively long chain components are used in th(e acid solution. The surface active agents can be blended directly with the components by themselves or combined with the acid solution. Alternatively, the surface active agent or agents can be admixed with the acid solution before the components are added thereto. The surfactants should be used in amounts sufficient to thoroughly disperse or dissolve the components in the acid solution. Examples of surface active agents that can be used are ethoxylated nonylphenols, fatty amines, ethoxylated fatty amines, quaternary fatty amines and ethoxylated quaternary fatty amines.

Separation of the components from, or lack of sufficient dispersion of the components in, the acid solution may occur in some instances. Such separation or lack of dispersion may result in lower efficiency. Accordingly, use of surface active agents, as above described, may be required to help produce sufficient dispersion to avoid precipitation. It is believed that sufficient dispersion may also be obtained by constant agitation or mixing of the acid solution in the components. Satisfactory agitation is believed to be provided by turbulent flow within the tubular goods in the well. A combination of mechanical mixing and the use of surface active agents may be employed to obtain sufficient dispersion.

Other additives that can be included in the inventive composition include corrosion inhibitors, pH control additives, fluid loss additives, non-emulsifying agents, oxygen scavengers, hydrogen sulfide scavengers, and mutual solvents.

Oxygen scavengers can be used to reduce the amount of oxygen present in the acid w solution to inhibit formation of ferric iron by oxidation of ferrous iron. Compounds such as erythorbic acid and hydroxylamine complex serve as both iron reducing agents and oxygen scavengers. Erythorbic acid also acts as an iron complexing agent.

A suitable mutual solvent for use in the present invention is ethylene glycol monobutyl ether ($C_6H_{14}O_2$). Ethylene, glycol monobutyl ether helps solubulize hydrophobic components in the solution.

Reduction of the ferric ion present in the acidizing composition helps prevent the formation of sludge in crude oil. The use of one or more surfactants in the inventive composition can further decrease sludge formation. For example, a useful surfactant for further decreasing sludge formation is dodecylbenzenesulfonic acid. Additional anti-sludge agents can be used as well. The specific surfactants and anti-sludge agents that should be used to combat sludge are dependent upon the specific crude oil and formation conditions and characteristics and other factors known to those skilled in the art.

In another aspect, the present invention provides a method of treating a subterranean formation in the presence of ferric ions. In accordance with the inventive method, the inventive acidizing composition is formulated and introduced into the well. The components can be injected and circulated in the well by any technique known in the art. They can be admixed and then injected or separately injected, for example, on the fly, such that they are admixed in the well.

The acidizing composition is preferably recovered from the well after it has become substantially spent or after the well has been sufficiently treated. The spent acid can be removed from the formation via the wellbore, can be forced through the formation to a recovery well, or can be forced over a wide area so that any precipitate that may form will have only a small detrimental effect, if any.

The following examples are provided in order to help provide a clear understanding of the compositions and method of the present invention. The examples are presented to illustrate certain specific embodiments of the invention, but they are not to be construed so as to be unduly restrictive of the scope or spirit thereof.

EXAMPLE I

The inventive composition was tested for its ability to reduce the formation of sludge in a crude oil known to generate sludge when contacted with hydrochloric acid contaminated with ferric ion. The tests were carried out by contacting Mobil 10-11-62-12W5 crude oil with a 15% hydrochloric acid solution.

Initial tests were carried out on test fluids (acid solutions and crude oil) wherein the acid solution contained only an anti-sludging agent. The anti-sludging agent was dodecylbenzene sulfonic acid. The tests were then duplicated except the acid solutions also included the electron donor agent and primary electron transfer agent in accordance with the invention. The electron donor agent used was thioglycolic acid. The primary electron transfer agent used was ammonium molybdate $((NH_4)_6MoO_7O_{24})$.

Each test fluid included approximately 1.5% by volume dodecylbenzene sulfonic acid (an anti-sludge additive at 40% activity), based on the total volume of the acid solution. The anti-sludge additive was utilized to eliminate any sludge induced by the acid alone (without ferric ion contamination) so that the, ability of the inventive composition to prevent ferric ion induced sludge could be more accurately tested.

When employed, thioglycolic acid was used in an amount of approximately 1% by volume, based on the total volume of the acid solution. The primary electron transfer agent was used in an amount of approximately 40 pounds per 1000 gallons of the acid solution (in applicable tests).

Two sets of fluids were tested, one set without added ferric ion and one set with added ferric ion. The test fluids with added ferric ion were contaminated with approximately 5000 ppm ferric ion by adding a corresponding amount of iron chloride $(FeCl_3.H_2O)$ thereto.

Each test was carried out by contacting approximately 25 mL of the test fluid with approximately 25 mL of the subject crude oil in a beaker. The mixture was heated to approximately 175° F. The test fluid was then poured through a 200 mesh screen and the screen visually observed for the formation of sludge after approximately 30 minutes. The results are shown by Table I below.

TABLE I

Sludge Tests of Inventive Acidizing Solution

| Test Fluid | Acid Solution[1] | Electron Donor Agent[2] | Primary Electron Transfer Agent[3] | Added Ferric Ion[4] | Amount of Sludge[5] |
|---|---|---|---|---|---|
| 1 | 15% HCl | Yes | No | No | None |
| 2 | 15% HCl | Yes | No | Yes | Heavy |
| 3 | 15% HCl | Yes | Yes | No | Trace |
| 4 | 15% HCl | Yes | Yes | Yes | Trace |

[1]an aqueous acid solution containing hydrochloric acid in an amount of 15% by weight, based on the total weight of the acid solution
[2]thioglycolic acid
[3]ammonium molybdate
[4]when used, present in test fluid in an amount of 5000 ppm
[5]based on observation of test fluid after 30 minutes As shown by Table I, the inventive composition prevented the formation of sludge in the 15% HCl system.

EXAMPLE II

A series of experiments was carried out to test the rate of reduction of ferric ion ($Fe^{3+}$) by acidizing composition in both 15% and 28% hydrochloric acid systems.

The 15% hydrochloric acid system was tested first. The test composition comprised:

an acid solution including approximately 15% by weight hydrochloric acid, based on the total weight of the acid solution;

approximately 1% by volume thioglycolic acid based on the total volume of the acid solution; and approximately 40 pounds sodium molybdate per 1000 gallons of the acid solution.

Initially, the composition was a dark red-brown colored acid solution. Upon contamination with 5000 ppm ferric ion, the solution turned to a faint light brown. As reduction of ferric ion proceeded the fluid darkened and eventually returned to its uncontaminated color—dark red-brown. The time required was a function of the concentration of molybdenum ion in the solution. Thus, when the acid solution is a 15% hydrochloric acid solution, the primary electron transfer agent alone with the electron donor agent is sufficient to reduce the ferric ion.

The 28% hydrochloric acid solution was then tested. The solution comprised:

an acid solution including approximately 28% by weight hydrochloric acid, based on the total weight of the acid solution;

approximately 1% by volume thioglycolic acid based on the total volume of the acid solution;

approximately 40 pounds ammonium molybdate per 1000 gallons of the acid solution; and approximately 80 pounds potassium iodide per 1000 gallons of the acid solution.

Determining the rate of reduction of ferric ion in this fluid was more difficult due to the nature of the accompanying color changes exhibited by the fluid. Upon contamination with 5000 ppm ferric ion, the emerald green solution turned olive green in color. As reduction of ferric ion proceeded, the fluid returned to an emerald green color. Due to the similar nature of the observed color changes it was difficult to visually verify exactly how far the reducing reaction had proceeded.

The test fluids were contaminated with 5000 ppm of ferric ion by adding a corresponding amount of iron chloride $(FeCl_3.H_2O)$ thereto.

In order to verify that the ferric ion was reduced in the 28% hydrochloric acid system, a UV-VIS spectrophotometiy test was carried out on the composition. The test was also carried out on a 28% hydrochloric acid composition that did not include the secondary electron transfer agent. In other words, th(e only difference between the two test fluids was the second test fluid did not include any potassium iodide. The tests were simple and rapid. It was not necessary to dilute the test fluids. Each test fluid was tested with and without ferric ion.

In each test a standard 1 cm quartz curette was filled with the test fluid and placed into the spectrophotometer. The 200–600 nm range was then scanned. The test fluids were contaminated with 5000 ppm of ferric ion by adding a corresponding amount of iron chloride $(FeCl_3.H_2O)$ thereto.

An absorption centered at 440 nm was found in both compositions. In each system, addition of 5000 ppm ferric ion resulted in loss of the 440 nm absorption band. The band was covered by an intense absorption resulting from the ferric ion. However, after 15 minutes, the first test composition (the one including potassium iodide) returned to the original state and the spectrum exhibited a resolved absorption band at 440 nm in every way identical to the original. This indicated that a complete reduction of ferric ion had occurred. The second test fluid (the one without potassium iodide) was unchanged after 24 hours. Thus, when the acid solution includes 28% hydrochloric acid, the secondary electron transfer agent must be employed in the inventive composition.

EXAMPLE III

Next, tests were conducted to determine the optimum amounts of the electron transfer agent(s) that should be employed in the inventive acidizing composition. Each test fluid included 1% by volume thioglycolic acid, based on the total volume of the acid solution and was contaminated with 2500 ppm ferric ion (by adding a sufficient amount of ferric chloride to the fluid).

In a first series of tests, the acid solution included 15% by weight hydrochloric acid based on the total weight of the acid solution. These fluids also included the primary electron transfer agent, either sodium molybdate or ammonium molybdate. The amount the molybdate utilized was varied.

In a second series of tests, the acid solution included 28% by weight hydrochloric acid based on the total weight of the acid solution. These fluids also included the primary electron transfer agent, either sodium molybdate or ammonium molybdate, and the supplemental electron transfer agent (potassium iodide). The amounts of the molybdate and potassium iodide utilized were varied.

In carrying out the tests, the amounts of the electron transfer agents utilized were cut in half until the 2500 ppm ferric ion was not completely reduced to ferrous ion in less than five minutes. The tests were carried out at room temperature. The test fluids were contaminated with 2500 ppm of ferric ion by adding a corresponding amount of iron chloride ($FeCl_3 \cdot H_2O$) thereto.

In the first series of tests (15% HCl), upon contamination with the ferric ion the test fluids turned from a red-brown color to a light tan color. It was determined that a complete reduction had taken place when the test fluids changed back to the red-brown color.

In the second series of tests (28% HCl), upon contamination with the ferric ion the test fluids turned from an emerald green color to an olive color. It was determined that a complete reduction had taken place when the test fluids changed back to the emerald green color (verified by UV-VIS experiments).

The tests showed that in 15% HCl systems, the optimum amount of sodium molybdate that should be used is approximately 14 pounds per 1000 gallons of the acid solution. In such systems, the optimum amount of ammonium molybdate that should be used is approximately 10 pounds per 1000 gallons of the acid solution. In 28% HCl systems, the optimum amount of sodium molybdate that should be used is approximately 28 pounds per 1000 gallons of the acid solution. In such systems, the optimum amount of ammonium molybdate that should be used is approximately 20 pounds per 1000 gallons of the acid solution. In 28% HCl systems, the optimum amount of potassium iodide that should be used is 10 pounds per 1000 gallons of the acid solution.

EXAMPLE IV

Emulsion break and sludging tests were carried out on four different types of crude oils. The inventive composition was compared to a prior art acidizing composition known to be effective in controlling sludge formation in mineral acid systems.

The four crude oils used in the tests were South Pass crude from Houma, La. ("Crude A"); Crutchley 3-10 from Brighton, Colo. ("Crude B"), BPX Troika from the Gulf of Mexico ("Crude C") and Pemex Tecominoacan # 446 from Tabasco, Mexico ("Crude D").

Each test was carried out using a hydrochloric acid solution including approximately 15% by weight hydrochloric a(id, based on the weight of the acid solution, and an amount of an anti-sludging additive, dodecylbenzene sulfonic acid, sufficient to prevent acid-induced sludging (e.g., sludge formation even in the absence of ferric ion). The inventive test fluids additionally included 1% by volume, based on the volume of the acid solution, thioglycolic acid and 14 pounds sodium molybdate ($Na_2MoO_4 \cdot 2H_2O$) per 1000 gallons of the acid solution. The prior art test fluids additionally included 1% by volume, based on the volume of the acid solution, thioglycolic acid and 2.2 pounds of cuprous chloride per 1000 gallons of the acid solution.

Test fluids were contaminated with 5000 ppm of ferric ion by adding a corresponding amount of iron chloride ($FeCl_3 \cdot H_2O$) thereto.

Each test was carried out by contacting approximately 25 mL of the test fluid with approximately 25 mL of the subject crude oil in a beaker. The test fluid and crude oil were each pre-heated prior to mixing. The mixture was heated to approximately 175° F and visually observed after approximately 30 minutes. The results are shown by Table II below.

TABLE II

Emulsion Break and Sludging Tests

S-1—Acid and anti-sludging agent
S-2—Acid, anti-sludging agent and 2500 ppm ferric ion
S-3—Prior art test fluid and 2500 ppm ferric ion
S-4—Inventive test fluid and 2500 ppm ferric ion

| Crude | A/S Amt[1] | S-1 EB[2] | S-1 Sludge[3] | S-2 EB[2] | S-2 Sludge[3] | S-3 EB[2] | S-3 Sludge[3] | S-4 EB[3] | S-4 Sludge[3] |
|---|---|---|---|---|---|---|---|---|---|
| A | 0.5% | 100% - 2 min. | None | 100% - 2 min. | Heavy | 100% - 1 min. | None | 100% - 1 min. | None |
| B | 0.5% | 100% - 1 min. | None | 100% - 1 min. | Slight | 100% - 1 min. | None | 100% - 1 min. | None |
| C | 0.5% | 100% - 3 min. | None | 100% - 3 min. | Moderate | 100% - 1 min. | None | 100% - 1 min. | None |
| D | 1.0% | 100% - 2 min. | None | 100% - 2 min. | Heavy | 100% - 1 min. | None | 100% - 1 min. | None |

[1]the amount of the anti-sludging additive, dodecylbenzene sulfonic acid
[2]the amount of time required for an emulsion formed by admixture of the test fluid and crude oil to break, and the degree to which the emulsion was broken - determined by visual observation
[3]the amount of sludge created by admixture of the test fluid and crude oil - determined by visual observation The data in Table III clearly show that the inventive acidizing composition is effective in reducing ferric iron, and preventing emulsion and sludge formation in mineral acid systems, and in connection with a variety of crude oils. The inventive composition was just as effective as the prior art system tested.

EXAMPLE V

A spending test was carried out on the inventive acidizing composition to determine if undesirable precipitation occurs upon spending of the acid. The composition consisted of an aqueous acid solution including approximately 15% by weight hydrochloric acid, based on the total weight of the acid solution; 1% by volume, based on the volume of the acid solution, thioglycolic acid (a solution including 80% by weight thioglycolic acid, based on the weight of the thioglycolic acid solution); and 14 pounds sodium molybdate ($Na_2MoO_4 \cdot 2H_2O$) per 1000 gallons of the acid solution. The composition was added to 50 grams of Icelandic spar in a 100 mL beaker and allowed into set for 48 hours (this period of time assured that the acid was completely spent). After the 48-hour period, no scaling or precipitate was observed.

EXAMPLE VI

Tests were carried out to determine the ability of the inventive acidizing composition to reduce ferric iron using various compounds as the electron donor agent of the composition.

A hydrochloric acid solution including approximately 15% by weight hydrochloric acid, based on the total weight of the acid solution, was used in each test. The various electron donor agents were each used in an amount such that the molar quantity of the electron donor agent was equal to the molar quantity of thioglycolic acid when thioglycolic acid is used in an amount of 1% by volume of the acid solution. In each test, the electron transfer agent was ammonium molybdate and was employed in an amount of 20 pounds per 1000 gallons of the acid solution.

Each test was carried out by visually observing the color change that occurred upon addition of 2500 ppm ferric ion to the test fluid and whether or not the test fluid ultimately turned back to the original color (indicating reduction of the ferric ion). The tests were carried out at room temperature. The test fluids were contaminated with 2500 ppm of ferric ion by adding a corresponding amount of iron chloride ($FeCl_3 \cdot H_2O$) thereto.

The results of the tests are shown by Table III below:

TABLE III

Reduction of Fe(III) Using Various Electron Donor Agents

| Electron Donor Agent | Reduction of Fe(III) |
| --- | --- |
| Thiourea | No |
| Erythorbic acid | No |
| 3-mercapto-1,2-propanediol | Yes |
| Thiomalic (mercaptosuccinic) acid | Yes |
| Hypophosphorous acid | yes |

The above test of hypophosphorous acid ($H_3PO_2$) was repeated except the acid solution included 28% by weight hydrochloric acid based on the weight of the acid solution and 20 pounds of potassium iodide per 1000 gallons of the acid solution were added to the test fluid.

The results were the same—ferric ion was reduced to ferric iron.

Thus, the results confirm that most, if not all, thiol compounds that include an oxygen compound or oxygen functional group in the beta position as well as a hypophosphorous acid can be used as electron donor agents in accordance with the invention. Other reducing agents including thiourea and erythorbic acid do not work.

The preceding examples can be repeated with similar success by substituting the generically or specifically described steps and operating conditions of this invention for those used in the examples.

Although certain preferred embodiments of the invention have been described for illustrative purposes, it will be appreciated that various modifications and innovations of the inventive method and composition may be effected without departure from the basic principles which underlie the invention. Changes of this type are therefore deemed to lie within the spirit and scope of the invention except as may be necessarily limited by the inventive claims and reasonable equivalents thereof.

What is claimed is:

1. An acidizing composition comprising:
   an aqueous mineral acid solution;
   an electron donor agent selected from the group consisting of hypophosphorous acid and hypophosphorous acid precursors; and
   an electron transfer agent, said electron transfer agent being a source of molybdenum ions, whereby said electron donor agent and said electron transfer agent function together to reduce ferric ion present in said mineral acid solution to ferrous ion.

2. The composition of claim 1, wherein said electron donor agent is selected from the group consisting of hypophosphorous acid, sodium phosphinate, calcium phosphinate, ammonium phosphinate and potassium phosphinate.

3. The composition of claim 1 wherein said electron donor agent is present in said composition in an amount in the range of from about 0.01% to about 10% by volume based on the volume of said acid solution.

4. The composition of claim 1 wherein said electron transfer agent is selected from the group consisting of ammonium molybdate and sodium molybdate.

5. The composition of claim 1 wherein said electron transfer agent is present in said composition in an amount in the range of from about 5 pounds to about 40 pounds per 1000 gallons of said aqueous acid solution.

6. An acidizing composition comprising:
   an aqueous mineral acid solution including hydrochloric acid in an amount of greater than approximately 17% by weight based on the total weight of the aqueous mineral acid solution;
   an electron donor agent;
   an electron transfer agent, said electron transfer agent being a source of molybdenum ions, whereby said electron donor agent and said electron transfer agent function together to reduce ferric ion present in said mineral acid solution to ferrous ion; and
   a supplemental electron transfer agent, said supplemental electron transfer agent being selected from the group consisting of a source of iodide ion and a source of iodine.

7. The composition of claim 6 wherein said supplemental electron transfer agent is selected from the group consisting of potassium iodide, sodium iodide and iodine.

8. The composition of claim 6 wherein said supplemental electron transfer agent is present in said composition in an amount in the range of from about 10 to about 80 pounds per 1000 gallons of said aqueous acid solution.

9. A method of treating a subterranean formation, comprising:

contacting the formation with an acidizing composition, said acidizing composition including:
an aqueous mineral acid solution;
an electron donor agent, said electron donor agent being selected from the group consisting of a thiol compound having a carbon chain that includes an oxygen or oxygen containing functional group in the beta position, hypophosphorous acid, and a hypophosphorous acid precursor; and
an electron transfer agent, said electron transfer agent being a source of molybdenum ions, whereby said electron donor agent and said electron transfer agent function together to reduce ferric ion present in said aqueous mineral acid solution to ferrous ion.

10. The method of claim 9 wherein said electron donor agent is a thiol compound selected from the group consisting of compounds of the formula $HSCH_2C(O)R_1$ and compounds of the formula $HSCH_2C(OH)R_3R_4$ wherein:

$R_1$ is either OH, OM or $R_2$;

M is a corresponding cation of the carboxylate anion of the thiol;

$R_2$ is an organic radical having from 1 to 6 carbon atoms;

$R_3$ is either H or an organic radical having from 1 to 6 carbon atoms; and $R_4$ is either H or an organic radical having from 1 to 6 carbon atoms.

11. The method of claim 10 wherein said electron donor agent is selected from the group consisting of thioglycolic acid, thioglycolic acid precursors, β-hydroxymercaptans, thiomalic acid and thiolactic acid.

12. The method of claim 11 wherein said electron donor agent is thioglycolic acid.

13. The method of claim 9 wherein said electron donor agent is selected from the group consisting of hypophosphorous acid and hypophosphorous acid precursors.

14. The method of claim 13 wherein said electron donor agent is selected from the group consisting of hypophosphorous acid, sodium phosphinate, calcium phosphinate, ammonium phosphinate and potassium phosphinate.

15. The method of claim 9 wherein said electron donor agent is present in said composition in an amount in the range of from about 0.01% to about 10% by volume based on the volume of said aqueous acid solution.

16. The method of claim 9 wherein said electron transfer agent is selected from the group consisting of ammonium molybdate and sodium molybdate.

17. The method of claim 9 wherein said electron transfer agent is present in said composition in an amount in the range of from about 5 to about 40 pounds per 1000 gallons of said aqueous acid solution.

18. A method of treating a subterranean formation, comprising:

contacting the formation with an acidizing composition, said acidizing composition including:
an aqueous mineral acid solution comprising hydrochloric acid in an amount of greater than approximately 17% by weight based on the total weight of the aqueous mineral acid solution;
an electron donor agent;
an electron transfer agent, said electron transfer agent being a source of molybdenum ions, whereby said electron donor agent and said electron transfer agent function together to reduce ferric ion present in said aqueous mineral acid solution to ferrous ion; and
a supplemental electron transfer agent, said supplemental electron transfer agent being selected from the group consisting of a source of iodide ion and a source of iodine.

19. The method of claim 18 wherein said supplemental electron transfer agent is selected from the group consisting of potassium iodide, sodium iodide and iodine.

20. The composition of claim 18 wherein said supplemental electron transfer agent is present in said composition in an amount in the range of from about 15 to about 30 pounds per 1000 gallons of said aqueous acid solution.

* * * * *